United States Patent [19]
Peterson

[11] 3,750,500
[45] Aug. 7, 1973

[54] DOWEL PIN EXTRACTOR TOOL
[76] Inventor: Alton Peterson, 5826 S. Hately Ave., Cudahy, Wis.
[22] Filed: Apr. 29, 1971
[21] Appl. No.: 138,505

[52] U.S. Cl............... 81/52.35, 29/255, 81/53.2
[51] Int. Cl................. B25b 19/00, B25b 13/50
[58] Field of Search................. 29/254, 255, 281, 29/256; 81/52.35, 53.2

[56] References Cited
UNITED STATES PATENTS
2,916,813  12/1959  Belanger.................. 81/53.2 X
2,941,429  6/1960   Mason..................... 81/52.35 X
3,529,497  9/1970   Brooks.................... 29/254 X Primary Examiner—James L. Jones, Jr.
Assistant Examiner—Roscoe V. Parker

[57]  ABSTRACT

A pin extractor tool which may use screw fasteners of various sizes. This device includes a shank portion with a slideable sleeve which a chuck portion having a locking sleeve.

1 Claim, 11 Drawing Figures

Patented Aug. 7, 1973 3,750,500
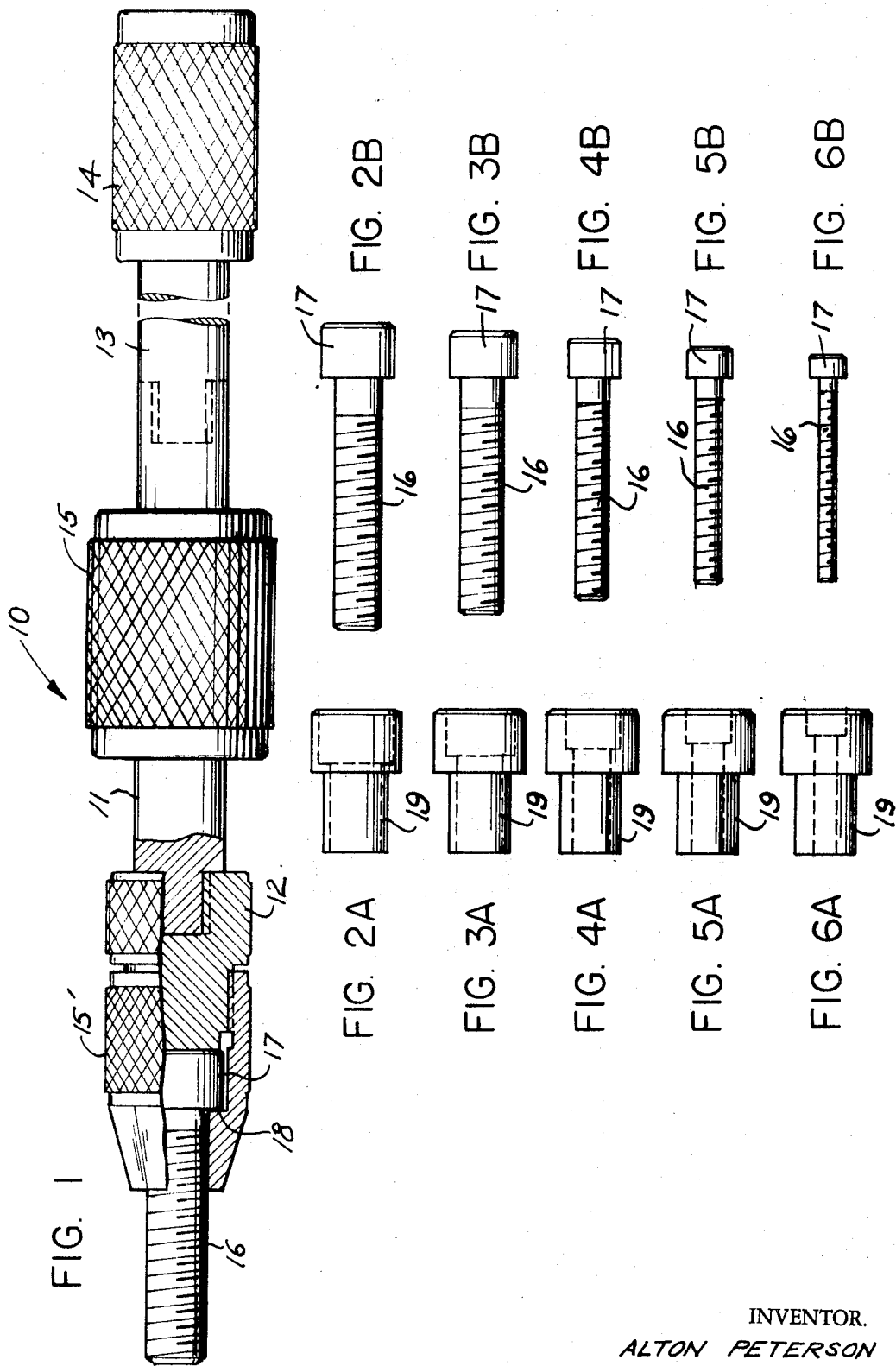
INVENTOR.
ALTON PETERSON

DOWEL PIN EXTRACTOR TOOL

This invention relates to hand tools, and more particularly to a dowel pin extractor tool.

It is therefore the principal purpose of this invention to provide a dowel pin extractor tool which will have the advantage over the tools of the prior art, in that it may use screws of various sizes.

Another object of this invention is to provide an extractor tool which will not require the use of a multiple number of adaptors that so often break.

A further object of this invention is to provide an extractor tool of the type described which if a screw should break all the user has to do is replace it with another screw.

Other objects of the present invention are to provide a dowel pin extractor tool which is simple in design, inexpensive to manufacture, rugged in construction, easy to use and efficient in operation.

These and other objects will be readily evident upon a study of the following specification and the accompanying drawing wherein:

FIG. 1 is a horizontal view of the present invention shown in elevation and partly broken away;

FIGS. 2A, 3A, 4A, 5A, and 6A are horizontal views of sleeves for fitting various screws; and FIGS. 2B, 3B, 4B, 5B, and 6B are horizontal views of socket-head cap screws.

According to this invention, a dowel pin extractor tool 10 is shown to include a bar portion 11 which is threaded into a knurled sleeve 12, the opposite end of bar 11 receiving a bar 13 having a knurled handle 14.

Slideable upon the connected bars 11 and 13 is a knurled sleeve 15 which serves as knocker means for tool 10.

A knurled sleeve 15' is threadingly attached to sleeve 12 and insertively receives a cap screw 16 so that its head 17 abuts with shoulder 18 on the interior of sleeve 15, the sleeve 15 serving to hold cap screw 16 tightly within the chuck portion of tool 10, the chuck portion comprising sleeve 12 interlocking sleeve 15.

It is to be noted that the threaded end of cap screw 16 is adaptable for engagement with a threaded opening in an end of a dowel pin.

The plurality of different size sleeves 19 are for fitting the various screws 16. These different sizes of sleeves are shown in FIGS. 2a through 6a, and the screws are shown in FIGS. 2b through 6b; it being noted that the outer diameter of the sleeve head is constant in all of the figures so to be receivable within the same knurled sleeve 15', while the opening within the head of sleeves 19 is varied so to accomodate the different sizes of screw heads 17, it being further noted that the different sizes of screws are adaptable for pulling different sizes of dowel pins.

It will be noted that the sleeves 12 and 15 are of such structure so as to accommodate various sized cap screw fasteners 16.

What I claim is:

1. A dowel pin extractor tool comprising interconnected and fitted bar members, a sleeve carried by said bar members serving as a knocker for said tool, a knurled handle carried by said tool for gripping it in the hands of a user, a pair of threaded and interconnected sleeves carried by said tool forming chuck means for securely holding screw fasteners of various sizes, one of said bars being externally threaded at one end for being received within one end of said knurled sleeves forming a chuck of said tool, an opposite end of said bar being entirely threaded for threadingly receiving said other bar having said knurled handle, said other bar being of a same diameter as said first bar in order that said knocker may freely slide thereon, one end of said sleeve forming said chuck being externally threaded and receiving a knurled locking sleeve, a shoulder formed within the bore of said locking sleeve abutting with the head of a cap screw received within said locking sleeve, said locking sleeve selectively receiving one of a plurality of different size screw adaptors, each of said sleeve adaptors comprising an enlarged head at one end of a shank, and being of a same outside diameter while an opening through each is varied to accommodate cap screws of different sizes.

* * * * *